March 8, 1955     P. F. KOPLIN     2,703,739
SEALING DEVICE
Filed Feb. 1, 1950

INVENTOR
PETER F. KOPLIN
BY
HIS ATTORNEY.

United States Patent Office 2,703,739
Patented Mar. 8, 1955

2,703,739

SEALING DEVICE

Peter F. Koplin, Easton, Pa., assignor to Ingersoll-Rand Company, New York, N. Y., a corporation of New Jersey Application February 1, 1950, Serial No. 141,653

2 Claims. (Cl. 309—43)

This invention relates to sealing devices, and more particularly to a sealing device intended for use between a reciprocatory member and cylinder.

It is an object of the invention to provide an effective seal between a reciprocatory member and a cylinder.

A further object of this invention is to prevent leakage of fluid medium through the sealing ring groove.

Other objects will be in part obvious and in part pointed out hereinafter.

Figure 1:
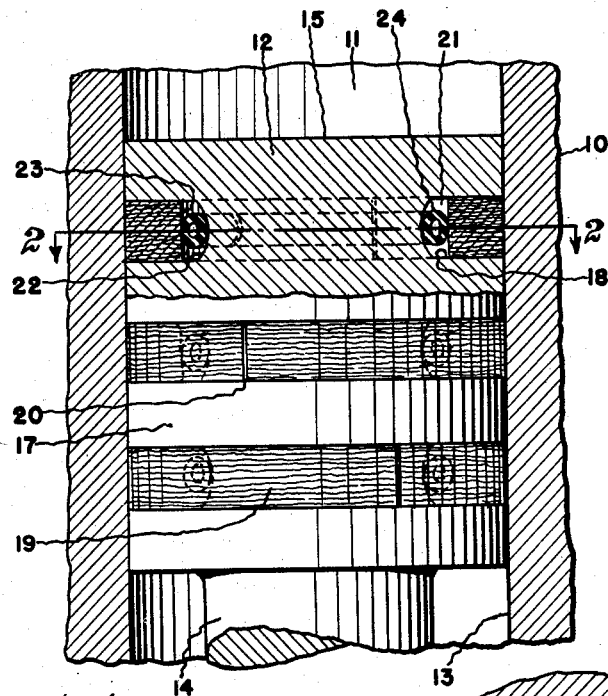
Figure 3:
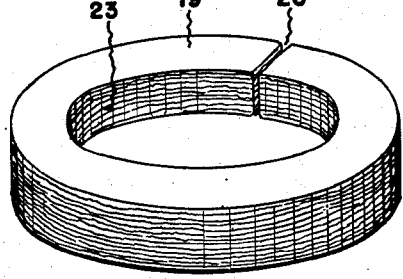
Figure 2:
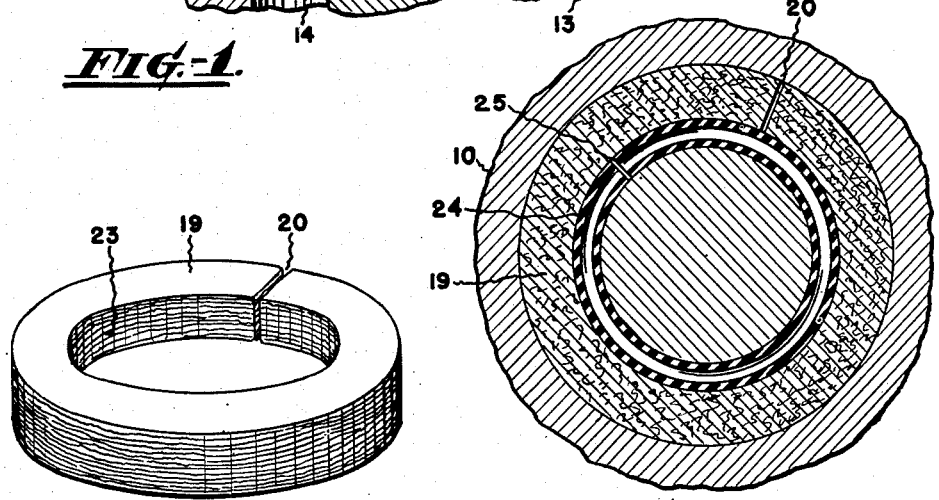

In the drawings which accompany this specification and in which identical reference numerals refer to similar parts, Figure 1 is a longitudinal view, partly broken away, of a portion of a cylinder and piston equipped with a sealing device constructed in accordance with the practice of this invention, Figure 2 is a transverse view taken along the line 2—2 of Figure 1 looking in the direction of the arrows, and Figure 3 is a perspective view of a detail.

Referring now to the drawings and more particularly to Figure 1, there is shown, for the purpose of illustrating the invention, a casing 10 having a piston chamber 11. A piston 12, having a running fit within the wall 13 of the piston chamber, reciprocates therein and is connected to any suitable device by a piston rod 14. The piston 12 is of a well known type and has a pressure surface 15 which is acted upon by a fluid medium, introduced into the cylinder through proper valving (not shown), to produce a motive force on the piston 12.

To insure a sliding fit between the piston 12 and the wall 13 the piston 12 is constructed so that the clearance between the piston and the cylinder wall 13 is relatively large, consequently, sealing means must be provided between the piston 12 and the wall 13 to prevent the fluid medium from leaking through the clearance. To this end the peripheral surface 17 of the piston 12 contains a series of annular grooves 18 having annular piston rings 19 confined therein which cooperate with the cylinder wall 13 to form a seal. The piston rings 19 may be of any suitable material, but are preferably formed of fabric as shown in the accompanying drawings. To allow the introduction of the rings 19 into the grooves 18 the rings are split as at 20.

The depth of the grooves 18 is made greater than the thickness of the piston rings 19 in order to provide spaces 21 between the bottoms 22 of the grooves 18 and the inner surfaces 23 of the piston rings 19 and the bottoms 22 of the grooves 18 are concavely curved to centrally locate flexible expander rings 24, preferably made of soft rubber and split as at 25, which are interposed in the spaces between the bottoms 22 of the grooves 18 and the inner surfaces 23 of the piston rings 19 and which are of cylindrical shape. The rings 24 are of a tubular shape and have a diameter which exceeds the depth of the spaces 21, thus, when inserted into the grooves, the expander rings 24 are compressed by the piston rings 19 into sealing engagement with the inner surfaces 23 of the piston rings 19 and the bottoms 22 of the grooves 18. Since the expander rings 24 always tend to return to their normal shape a force is applied to the piston rings 19 which urges them outwardly of the grooves 18 and into sealing contact with the cylinder walls 13.

I claim:

1. A sealing device for a piston having an annular groove in its periphery, a fabric piston ring in the groove, and a rubber tubular expander ring urging the piston ring outwardly from the groove, said expander being in sealing contact with the bottom of the groove.

2. A sealing device for a piston having an annular groove in its periphery, said groove being formed with a concave bottom, a fabric piston ring in the groove having a cylindrical inner surface, and a rubber tubular expander ring to urge the piston ring outwardly of the groove, said expander ring being in sealing contact with the bottom of the groove and with the cylindrical inner surface.

References Cited in the file of this patent

UNITED STATES PATENTS

| Number | Name | Date |
|---|---|---|
| 752,046 | Dawson | Feb. 16, 1904 |
| 1,393,490 | Bradley | Oct. 11, 1921 |
| 1,407,602 | Thomson | Feb. 21, 1922 |
| 1,535,552 | Small | Apr. 28, 1925 |
| 2,068,115 | Solenberger | Jan. 19, 1937 |
| 2,092,086 | Saharoff | Sept. 7, 1937 |
| 2,631,907 | Johnson | Mar. 17, 1953 |

FOREIGN PATENTS

| Number | Country | Date |
|---|---|---|
| 25,629 | Germany | Jan. 29, 1884 |